Sept. 4, 1934. A. M. LOBDELL 1,972,453
SAWING MACHINE
Filed May 25, 1933 2 Sheets-Sheet 1
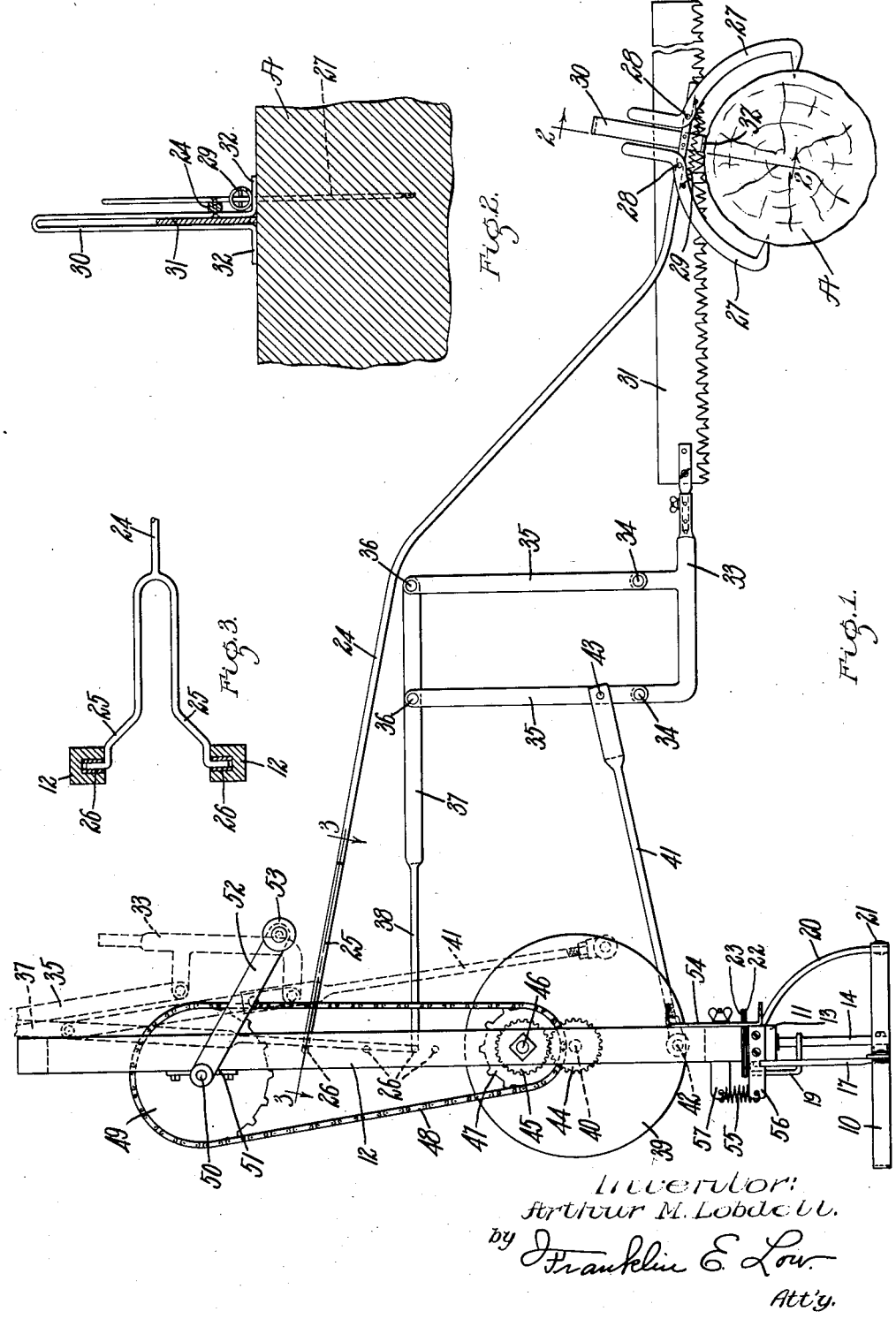

Sept. 4, 1934.  A. M. LOBDELL  1,972,453
SAWING MACHINE
Filed May 25, 1933   2 Sheets-Sheet 2
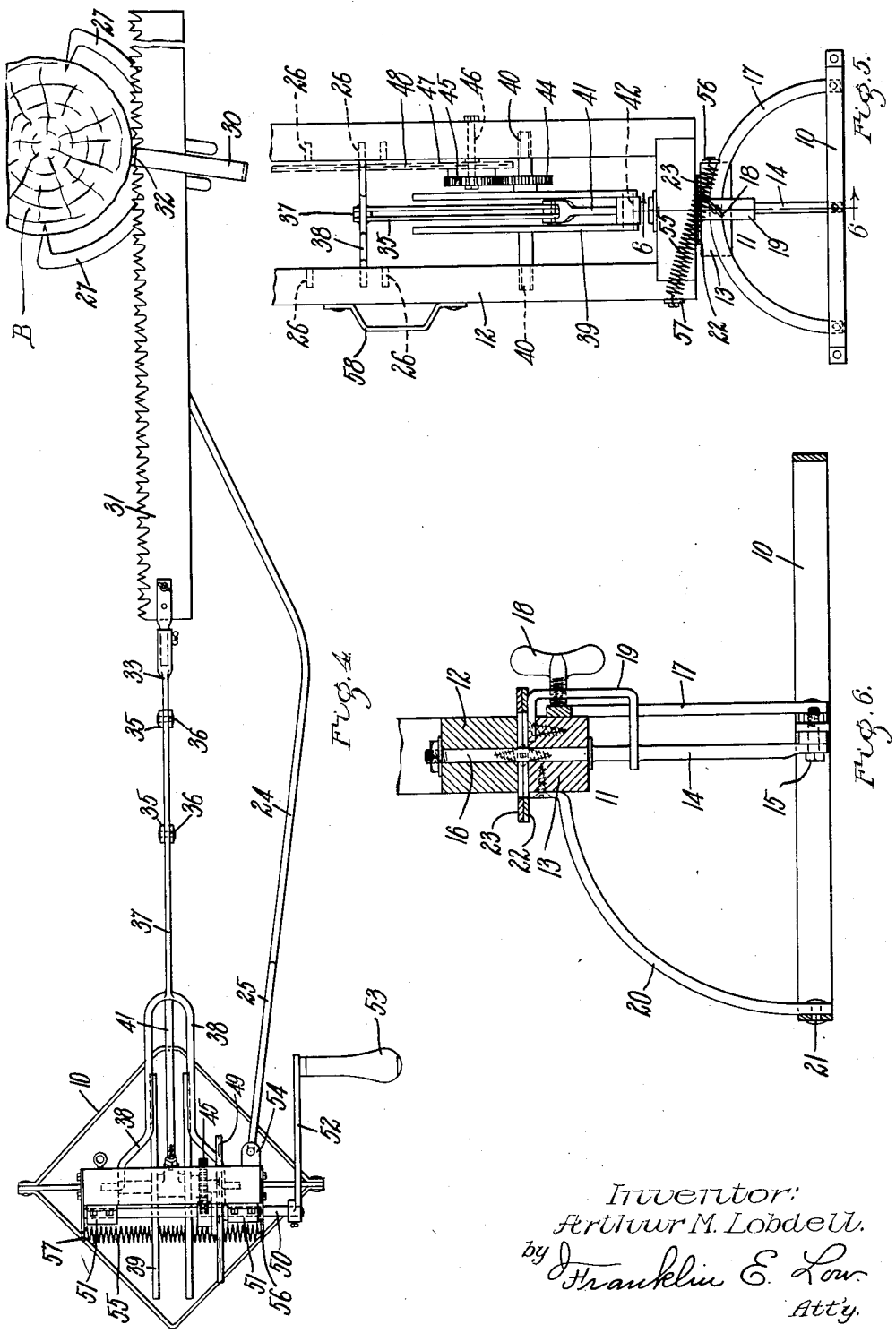
Inventor:
Arthur M. Lobdell.
by Franklin E. Low
Atty.

Patented Sept. 4, 1934

1,972,453

UNITED STATES PATENT OFFICE 1,972,453

SAWING MACHINE

Arthur M. Lobdell, Plympton, Mass., assignor to Lobdell, Swift & Sons, Plympton, Mass., a partnership consisting of Arthur M. Lobdell, Francis L. Swift, William G. Swift, and Harry F. Swift Application May 25, 1933, Serial No. 672,788

3 Claims. (Cl. 143—63)

This invention relates to improvements in sawing machines and particularly to a portable manually-operated type of machine for sawing lumber, standing timber, logs, and the like.

The object of the invention is to provide a light, portable manually operable type of machine for felling standing timber and also for sawing said timber into logs, the machine being so constructed that it may be employed upon work which is located either in a vertical or horizontal position, or at various angles to the ground, such, for example, as trees growing upon the sides of hills, or logs lying upon uneven or hilly ground.

It is still further an object of the invention to so construct the machine that certain portions thereof may be folded against the frame, while certain other portions may be easily and quickly dismantled and held in a compact position against said frame, so that the machine may be easily transported from place to place.

It is still further an object of the invention to so suspend the saw and connect the same with its operating mechanism that the movement imparted to said saw will resemble the arm and elbow motion usually imparted to hand saws.

The invention consists in a sawing machine as set forth in the following specification and particularly as pointed out in the claims thereof.

Referring to the drawings:—

Figure 1 is a side elevation of the sawing machine of this invention, the same being positioned to saw logs or timber laying upon the ground.

Fig. 2 is an enlarged detail section taken on the line 2—2 of Fig. 1.

Fig. 3 is a detail section taken on the line 3—3 of Fig. 1.

Fig. 4 is a plan view of the machine illustrating the same in position to saw through a standing tree.

Fig. 5 is a left hand end elevation of the lower portion of the machine.

Fig. 6 is an enlarged vertical section taken on the line 6—6 of Fig. 5.

Like numerals refer to like parts throughout the several views of the drawings.

In the drawings, 10 represents a base preferably square in form, and 11 is a support for a frame 12, said support and frame being mounted upon said base. The support 11 embodies therein a block 13 having a rod 14 extending therethrough and projecting downwardly therefrom, and said rod is pivotally attached at its lower end at 15 to the base 10. An upper portion 16 of the rod 14 projects from the block 13 through the frame 12 and constitutes a pivot upon which the frame may rotate. The frame 12 is furthermore secured to the portion 16 of the rod 14 by a nut, as illustrated in Fig. 6.

A segment 17 is fastened to the base 10; and the support 13 and frame 12 may be rocked in unison to position said frame at different angles to a vertical plane upon said base and then secured to the segment 17 by a clamping screw 18, the latter being mounted in a bar 19, the opposite ends of which are securely fastened to the support 13 and rod 14, see Fig. 6. A brace 20 is also provided for the support 13, the upper extremity of said brace being rigidly fastened to said support, and the lower extremity thereof being pivoted at 21 to the base 10. A circular plate 22 is rigidly secured to the upper surface of the support 13 and a similar bearing plate 23 is rigidly fastened to the lower edge of the frame 12, and the adjacent surfaces of said plates contact with each other and slide one upon the other when the frame 12 is rotated upon its pivot 16.

In performing the sawing operation, it is desirable that the frame of the machine shall be positioned a certain distance from the work; and an arm 24 is therefore provided, one end of said arm being fastened to the frame 12 and the other end thereof having a means for gripping the work mounted thereon. The end portion of the arm 24 that is attached to the frame 12 is bifurcated, being provided with resilient furcations 25 which may be sprung together to permit the extremities thereof to spring into oppositely disposed holes 26 provided in the frame 12.

The frame 12 is rectangular in form, and there are a series of holes 26 provided upon the inner surfaces of the side members of said frame, and the furcations 25 of the arm 24 may be positioned in any of the holes 26 and constitute pivots for said arm. A pair of tongs 27 are pivotally mounted at 28 upon the outer extremity of the arm 24 and when the work to be sawed is resting in a horizontal position upon the ground as illustrated at A in Fig. 1, the gripping jaws of said tongs engage the opposite sides of said log, said jaws being pulled toward each other by a spring 29.

Also mounted upon the outer extremity of the arm 24 and rigidly secured thereto is a guide 30 for a saw 31, the latter moving between side portions of said guide as it is moved across the work. The guide 30 is provided with a pair of oppositely disposed feet 32 which are adapted to rest upon the work as illustrated in Fig. 2.

The saw 31 is detachably mounted upon a saw holder 33 which is suspended at 34 at the lower extremities of links 35, in turn suspended at their upper extremities at 36 from an arm 37, one end portion of which is bifurcated and provided with furcations 38 which are adapted to be sprung toward each other and spring into a pair of the oppositely disposed holes 26 provided in the frame 12 in the same manner as is the arm 24.

The links 35 are located parallel to each other and are swung in unison from the arm 37 to move the saw 31 across the work by a crank 39, rotatably mounted in suitable bearings 40 in the side members of the frame 12. A rod 41 is connected at one end thereof at 42 to the crank 39 and at its opposite end at 43 to one of the links 35. The crank 39 is rotated by a gear 44 which is rigidly fastened thereto, said gear in turn being driven by a gear 45 mounted upon a stud 46, in turn mounted upon the frame 12. A sprocket 47 is fastened to the gear 45 and said sprocket is rotated by a chain 48 driven by a sprocket 49 rigidly fastened upon a shaft 50 mounted in bearings 51 fastened to the frame 12. A rotary motion is imparted to the shaft 50 by an arm 52 provided with a handle 53.

When the device is utilized in sawing logs or work which is resting in a horizontal position, the arm 24 and gripping mechanism supported thereon is positioned as illustrated in Fig. 1. When, however, it is desired to employ the device in connection with a standing tree or work which is located in a vertical plane, the arm 24 is detached from the holes 26 in the frame 12 and the furcations 25 of said arm are sprung into engagement with a bracket 54 which is fastened to the frame 12. At this time the arm 24 and gripping and guiding mechanisms supported thereon are positioned as illustrated in Fig. 4 and as the saw 31 which has been turned from a vertical to a horizontal position is moved across the work, said saw is advanced into the work by means of a spring 55, one end of which is connected to an arm 56 fast to the block 13 of the support 11, and at its other end to an arm 57 which is fastened to the frame 12. A handle 58 is fastened to one of the side members of the frame 12, as illustrated in Fig. 5, and said handle is utilized in carrying the device from place to place.

The general operation of the sawing machine hereinbefore specifically described is as follows:— When it is desired to saw a log A, which is resting in a horizontal position, the device is positioned adjacent to the log as illustrated in Fig. 1. At this time the furcations 25 of the arm 24 are located in a pair of the oppositely disposed holes 26 located in the frame 12 and the tongs 27 are held in engagement with the log by means of the spring 29. The operator of the machine then grasps the handle 53 and turns the arm 52 in the usual well-known manner, driving the crank 39 and imparting a swinging movement to the links 35, thereby moving the saw 31 across the work. During the first part of the movement of the saw into the work, the saw is guided by the guide 30.

As the saw 31 is moved across the work, the weight of said saw, together with that of the holder 33, links 35 and arm 37, will cause the saw to advance into the work, but a spring may be employed, if it is so desired, one end of said spring being attached to the frame 12 and the other end of said spring being attached to the arm 37.

When it is desired to operate upon a standing tree, the arm 24, carrying the gripping and guiding mechanism, is removed from between the side members of the frame 12 and mounted within the bracket 54, and the tongs 27 caused to grip the tree B, as illustrated in Fig. 4. The saw 31 is then actuated as before mentioned, and as the cut is made into the tree the spring 55 causes the frame 12 to rotate upon the pivot 16 and thereby advance the saw into the work.

If the tree is not perpendicular to the ground, the frame 12 is adjusted upon the base 10, so that said frame will be parallel with the tree, the frame being held in this position by clamping the segment 16 between the support 13 and screw 18. In like manner, if the log A is not resting in a perfectly horizontal position upon the ground, the frame 12 may be positioned upon the base 10 until the saw is positioned to cut straight across said log.

In transporting the machine from place to place, the saw 31 is removed from its holder 33 and said holder, links 35, arm 37 and connecting rod 41 are folded against the frame and into the dotted line position illustrated in Fig. 1. The arm 24 is detached from the frame 12 and with the gripping and guiding mechanism attached thereto is placed against the frame, to which it is secured in any suitable manner. The saw 31 is also secured to one of the side members of the frame. When the parts are so positioned, the entire device may be easily carried by means of the handle 58.

Practically all of the work usually performed by a cross-cut saw may be accomplished by the machine of this invention, but with greater speed and less exertion to the operator.

I claim:

1. A sawing machine having, in combination, a base, a support pivotally mounted upon said base, a frame rotatably mounted upon said support, means to clamp said support to said base, whereby said frame may be positioned at different angles to a vertical plane, an approximately horizontally disposed arm pivotally attached at one end thereof to said frame and embodying therein a bifurcated portion adapted to spring into engagement with the frame, a pair of links pivotally suspended in parallel relation from the outer end portion of said arm, a saw holder suspended from said links, a saw detachably mounted upon said holder and adapted to rest against the work, a crank operatively connected to said holder, manually actuated means to drve said crank, whereby said saw is moved across the work, another arm also pivotally mounted upon said frame and embodying therein a bifurcated portion adapted to spring into engagement with the frame, a pair of tongs attached to said last-named arm and adapted to grip the work, means also fast to said last-named arm to guide the saw as it enters the work, and means to move the saw into the work as it passes thereacross.

2. A sawing machine having, in combination, a base, a support pivotally mounted upon said base, a frame rotatably mounted upon said support and embodying therein a pair of side members spaced apart and provided with a plurality of pairs of oppositely aligned pivot holes therein, means to clamp said support to said base, whereby said frame may be positioned at different angles to a vertical plane, an approximately horizontally disposed arm pivotally attached at one end thereof to said frame and embodying therein a bifurcated portion adapted to spring into certain of said pivot holes in said side members, a pair of links pivotally suspended in parallel relation from the outer end portion of said arm, a saw holder pivotally suspended from said links, a saw detachably mounted upon said holder and adapted to rest against the work, a crank operatively connected to said holder, manually actuated means to drive said crank, whereby said saw is moved across the work, another arm also pivotally mounted upon said frame and embodying therein yieldable furcations adapted to spring into certain of the pivot holes of said side members, a pair of tongs attached to said last-named arm and adapted to grip the work, means also fast to said last-named arm to guide the saw as it enters the work, and means to move the saw into the work as it passes thereacross.

3. A sawing machine having, in combination, a base, a support pivotally mounted upon said base, a frame rotatably mounted upon said support and embodying therein a pair of side members spaced apart, a bracket fast to said frame, means to clamp said support to said base, whereby said frame may be positioned at different angles to a vertical plane, an arm pivotally mounted upon said frame between said side members, a pair of links suspended in parallel relation from the outer end portion of said arm, a saw holder pivotally suspended from said links, a saw detachably mounted upon said holder and adapted to rest against the work, a crank operatively connected to said holder, manually actuated means to drive said crank, whereby said saw is moved across the work, another arm also pivotally mounted upon said frame and adapted to spring into holding engagement with said side members, said last-named arm also being adapted to spring into holding engagement with said bracket, whereby the arm may be supported at right angles to the support provided by the side members, a pair of tongs attached to said last-named arm and adapted to grip the work, means also fast to said last-named arm to guide the saw as it enters the work, and means to move the saw into the work as it passes thereacross.

ARTHUR M. LOBDELL.